United States Patent
Brusarosco et al.

(10) Patent No.: US 7,908,918 B2
(45) Date of Patent: Mar. 22, 2011

(54) TYRE COMPRISING AN ELECTRONIC UNIT AND A METHOD OF INSTALLING SAID ELECTRONIC UNIT INTO SAID TYRE

(75) Inventors: Massimo Brusarosco, Milan (IT); Federico Mancosu, Milan (IT); Anna Paola Fioravanti, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 78 days.

(21) Appl. No.: 12/226,609

(22) PCT Filed: Apr. 26, 2006

(86) PCT No.: PCT/EP2006/003844
§ 371 (c)(1),
(2), (4) Date: Jan. 23, 2009

(87) PCT Pub. No.: WO2007/121768
PCT Pub. Date: Nov. 1, 2007

(65) Prior Publication Data
US 2009/0183562 A1    Jul. 23, 2009

(51) Int. Cl.
*B60C 23/02* (2006.01)
(52) U.S. Cl. .................................. 73/146.5
(58) Field of Classification Search ................ None
See application file for complete search history.

(56) References Cited

U.S. PATENT DOCUMENTS

| | | | |
|---|---|---|---|
| 5,090,237 A | | 2/1992 | Schrumpf et al. |
| 2005/0132788 A1* | | 6/2005 | Lionetti et al. ................ 73/146 |
| 2007/0052528 A1* | | 3/2007 | Wilson et al. ................ 340/447 |
| 2007/0272344 A1* | | 11/2007 | Shimura ..................... 156/123 |
| 2009/0115591 A1* | | 5/2009 | Mancosu et al. ............. 340/447 |
| 2009/0183562 A1* | | 7/2009 | Brusarosco et al. ........ 73/146.5 |
| 2009/0188310 A1* | | 7/2009 | Mancosu et al. ........... 73/146.3 |
| 2009/0320580 A1* | | 12/2009 | Mancosu et al. .............. 73/146 |
| 2010/0126263 A1* | | 5/2010 | Brusarosco et al. .......... 73/146 |

FOREIGN PATENT DOCUMENTS

| | | |
|---|---|---|
| DE | 102 55 138 A1 | 6/2004 |
| EP | 1 439 079 A2 | 7/2004 |
| JP | 2002-211222 | 7/2002 |

\* cited by examiner

*Primary Examiner* — Andre J Allen
(74) *Attorney, Agent, or Firm* — Finnegan, Henderson, Farabow, Garrett & Dunner, LLP

(57) ABSTRACT

A tire having an internal surface of substantially toroidal conformation, includes an electronic device including an electronic unit and an antenna, the latter being connected with the electronic unit and having an inner perimetral edge, and an anchoring body mounted on the internal surface for engagement between the electronic device and the tire, the anchoring body including at least two portions, said electronic unit being arranged between the portions. Each of the portions has a fastening surface secured to the internal surface of the tire and a groove in which the inner perimetral edge of the antenna is fitted to maintain a constraint between the electronic unit and the anchoring body. Also disclosed is a method of installing an electronic unit into a tire.

49 Claims, 5 Drawing Sheets

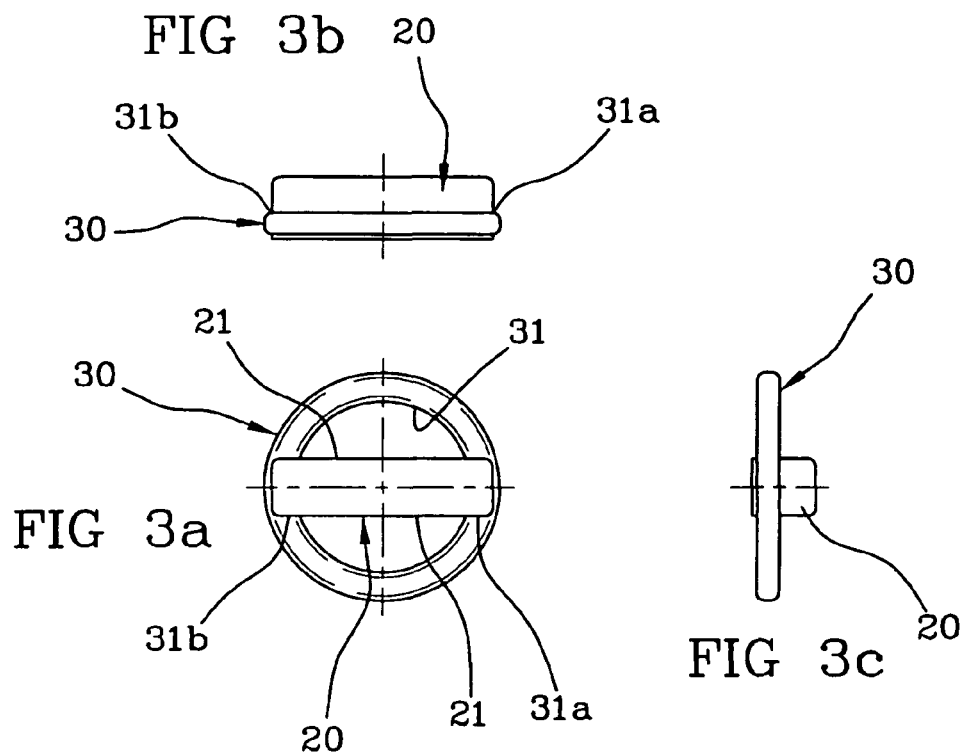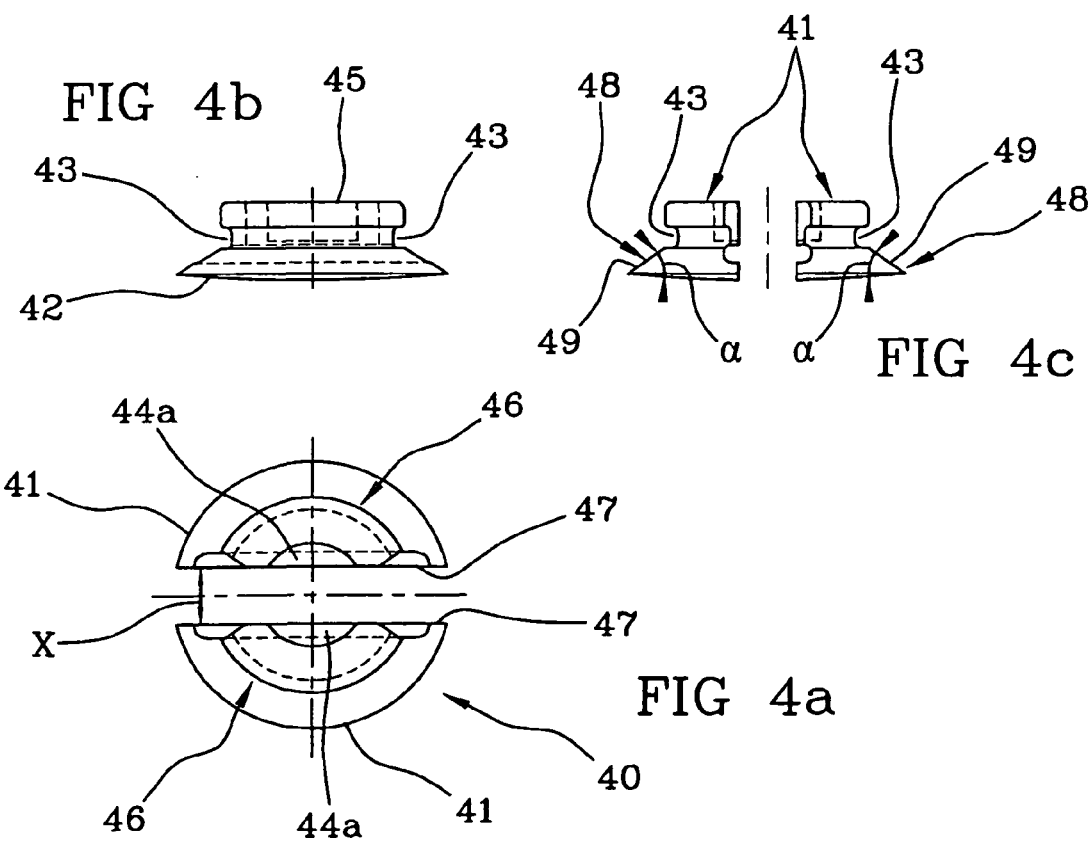

TYRE COMPRISING AN ELECTRONIC UNIT AND A METHOD OF INSTALLING SAID ELECTRONIC UNIT INTO SAID TYRE

CROSS REFERENCE TO RELATED APPLICATION

This application is a national phase application based on PCT/EP2006/003844, filed Apr. 26, 2006, the content of which is incorporated herein by reference.

BACKGROUND OF THE INVENTION

1. Field of the Invention

The present invention relates to a tyre comprising an electronic unit. Said invention also relates to a method of installing said electronic unit into said tyre.

2. Description of the Related Art

On some types of vehicles the necessity is felt to monitor the operating conditions of the tyres and to possibly keep traces of the evolution in time of some characteristic operating parameters. For instance, when vehicles using tyres of the run flat type are concerned, i.e. tyres capable of ensuring some kilometers of distance covered even in case of tyre deflation, provided some characteristic parameters are complied with such as maximum speed, temperature and maximum distance to be traveled over, the above requirement is particularly felt for safe use of said type of tyres.

The characteristic parameters that are generally considered may be identification code, temperature, pressure, distance run by the tyre, as well as parameters originating from mathematical calculations that can be carried out within the tyre or on board the vehicle.

To this aim, within the tyre an electronic unit can be mounted, said electronic unit being suitable for obtaining at least one of the above characteristic parameters. Preferably, the electronic unit can comprise at least one sensor, possibly associated with a control unit (such as a microprocessor) and/or a data storage unit. The electronic unit is preferably associated to an antenna, preferably said antenna has the task of enabling radio-frequency signal exchange with the devices mounted on board the vehicle.

In addition, the antenna can allow the system present within the tyre to be suitably powered without using independent powering units (e.g. batteries within the tyre). Therefore, the apparatus mounted on board the vehicle are provided to generate an electromagnetic field with which the antenna placed in the tyre can be coupled by induction, and by virtue of which the necessary energy for operation of the sensor and the possible control unit is supplied by the antenna itself.

U.S. Pat. No. 5,090,237 proposes a pressure sensor for determining air pressure of a motor vehicle tyre; the sensor has a housing for extending into a recess formed in a rim wall of the tyre, and an annular flange located on the housing and supporting a spring against a side of the rim wall. The spring provides for clamping an outer flange portion of the pressure sensor housing against another side of the rim wall.

SUMMARY OF THE INVENTION

Within this technological field, the Applicant has felt the necessity:
to improve the manufacture simplicity of the anchoring body used for engagement between the electronic unit and the tyre;
to ensure an important mechanical uncoupling of the electronic unit from stresses generated on the unit itself, by the tyre during running;
to enable operation also under conditions of lack of pressure within the tyre;
to enable a simple application of said electronic unit to an already manufactured tyre, without affecting the operational features of the tyre itself (e.g. adhesion techniques used in the tyre repairing can be employed).

In addition, the Applicant has also felt the necessity to realize an anchoring body for the electronic unit which allows integration into the tyre during the assembling on the rim.

The Applicant has found that by associating an electronic unit to the tyre by means of an anchoring body having two portions, an antenna being fitted in a groove of said portions for maintaining a constraint between said portions and said electronic unit, a considerable manufacturing simplification can be achieved, and improvements can be obtained both in terms of reliability of engagement between the electronic unit and the tyre, and in terms of practical operation of the electronic unit itself.

In particular, according to a first aspect, the invention relates to a tyre for vehicle wheels, having an internal surface of substantially toroidal conformation, comprising:
an electronic device comprising an electronic unit and an antenna, the latter being connected with said electronic unit and having an inner perimetral edge;
an anchoring body mounted on said internal surface for engagement between said electronic device and said tyre, said anchoring body comprising at least two portions, said electronic unit being arranged between said portions, each of said portions having:
a fastening surface secured to the internal surface of said tyre;
a groove in which the inner perimetral edge of said antenna is fitted to maintain a constraint between the electronic unit and the anchoring body.

According to a different aspect, the present invention relates to a method of installing an electronic unit into a tyre, said method comprising the steps of:
providing a tyre having an internal surface of substantially toroidal conformation;
providing an anchoring body comprising at least two portions, each of said portions having a fastening surface and a groove;
providing an electronic device comprising an electronic unit and an antenna, the latter being connected with said electronic unit and having an inner perimetral edge;
fitting the inner perimetral edge of said antenna into the groove of each of said portions for engagement of said electronic unit between said portions;
securing the fastening surfaces of said portions to the internal surface of said tyre.

In a preferential embodiment, the anchoring body is fastened to the liner of the tyre; in such a case, preferably the main longitudinal extension of the electronic unit is transverse, and in particular perpendicular, to the equatorial plane of the tyre.

In a further preferential embodiment, the anchoring body is fastened to a sidewall of the tyre; in such a case, the main longitudinal extension of the electronic unit is substantially parallel to the equatorial plane of the tyre.

The structural solution of the latter embodiments is aimed at minimizing the effect which the deformation undergone by the tyre during operation may have on the electronic unit and on the constraint between the anchoring body and the tyre.

In another preferential embodiment, the portions of the anchoring body are separate portions.

In particular, the two portions defining the anchoring body can be substantially identical to each other.

In this manner an increased manufacturing simplification is achieved, since both portions can be realized by means of a single mould.

BRIEF DESCRIPTION OF THE DRAWING

Further features and advantages will become more apparent from the detailed description of a preferred, but not exclusive, embodiment of a tyre comprising an electronic unit and of a method of installing said electronic unit into said tyre, in accordance with the present invention. This description will be set out hereinafter with reference to the accompanying drawings, given by way of non-limiting example, in which:

FIG. 3a is a diagrammatic plant view of the electronic device shown in FIG. 2a;

FIGS. 3b and 3c are diagrammatic side views of the electronic device shown in FIG. 2a;

FIG. 4a is a diagrammatic plant view of the anchoring body shown in FIG. 2a;

FIGS. 4b and 4c are diagrammatic side views of the anchoring body shown in FIG. 2a.

DETAILED DESCRIPTION OF THE INVENTION

With reference to the drawings, a tyre for vehicle wheels in accordance with the present invention has been generally denoted at 1.

Tyre 1 can be mounted on any type of vehicle such as motor vehicles or motorcycles; more particularly tyre 1 is preferably set to be used on vehicles that are provided on board with the necessary electronics for co-operating and interacting with the devices housed in the tyre itself and described in the following.

Tyre 1 (FIGS. 1a, 1b) has an internal surface 2 of substantially toroidal conformation; this internal surface 2 can comprise a layer of elastomeric material that is substantially airtight and is usually referred to as "liner".

Mounted on the internal surface 2 is an electronic device 10.

Figure 2A:
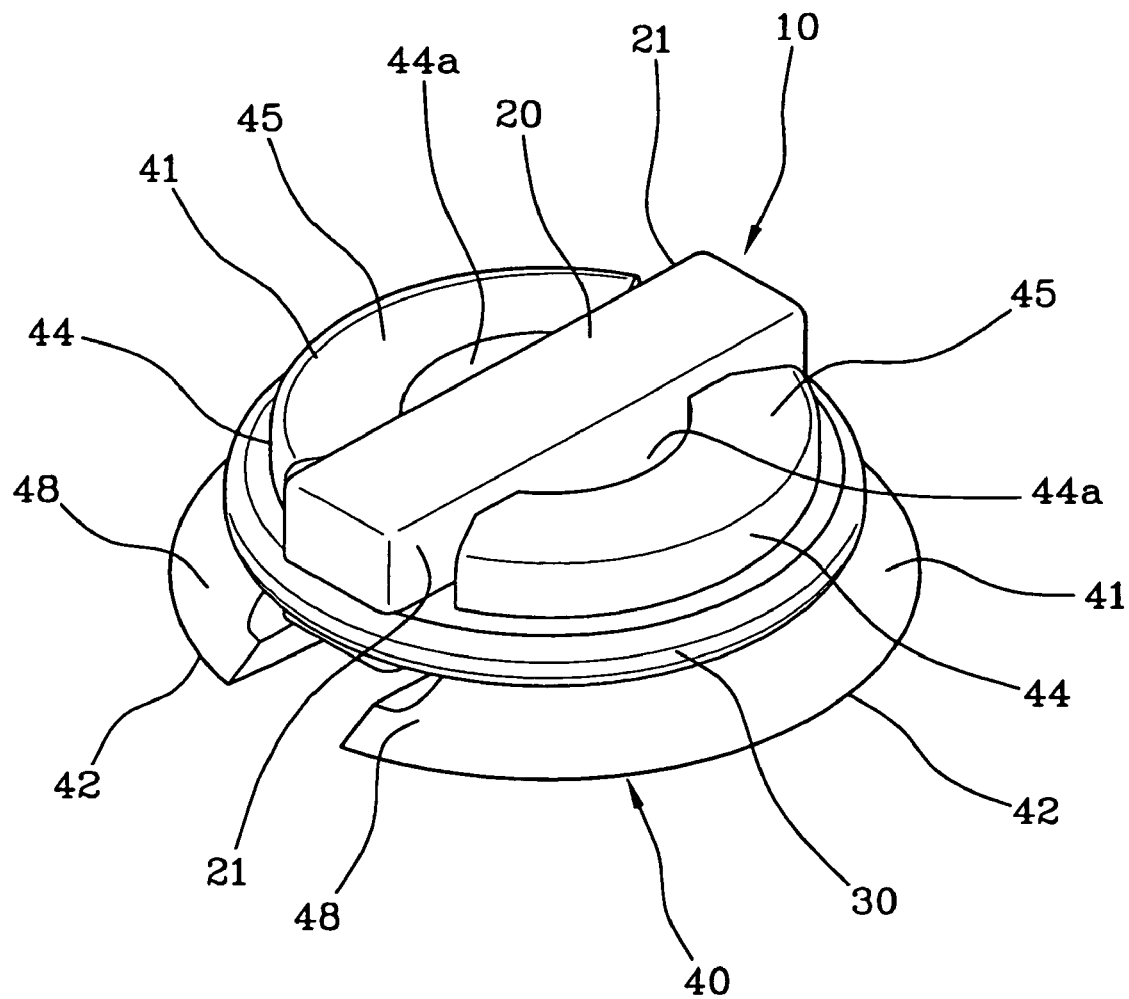
FIG. 2a is a diagrammatic perspective view of the electronic device of FIGS. 1a and 1b and the anchoring body associated thereto.
Figure 2B:
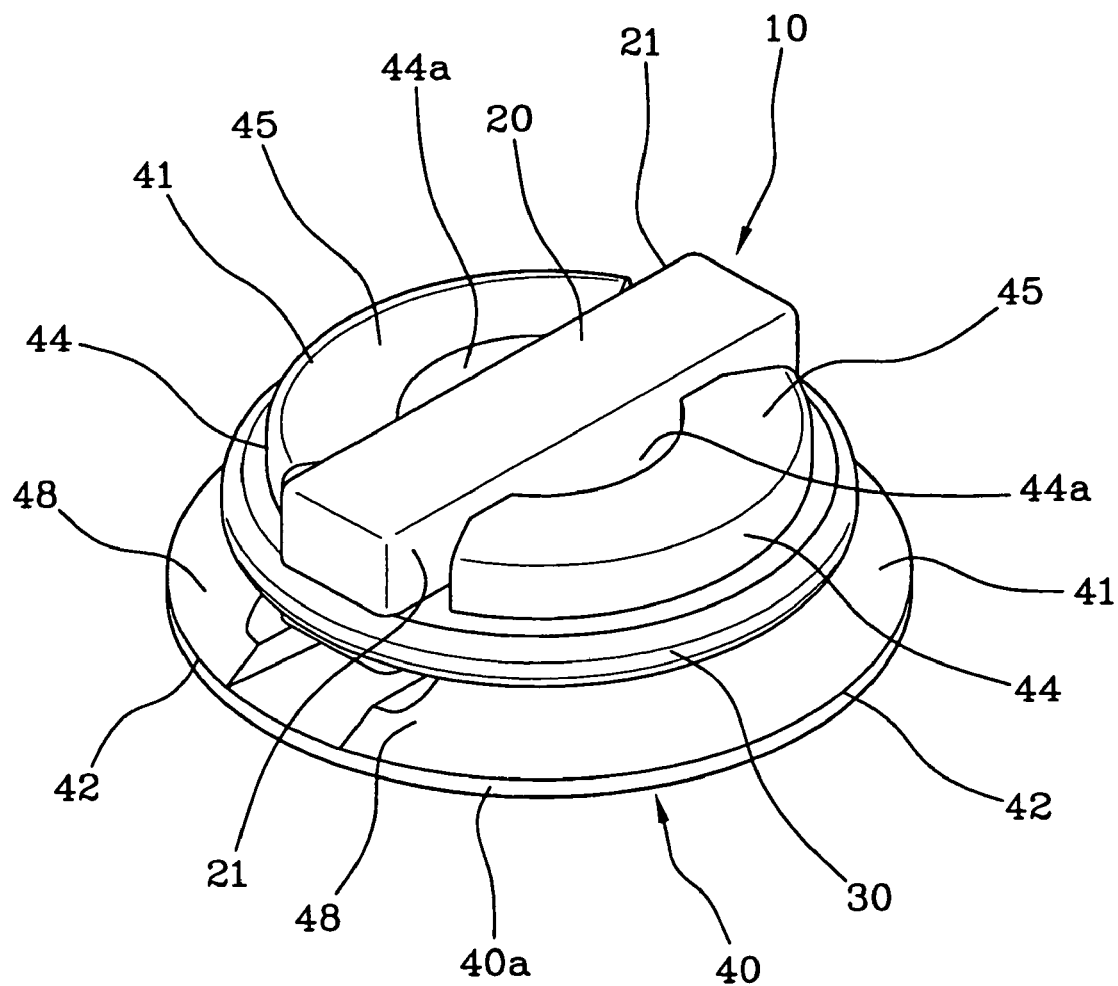
FIG. 2b is a diagrammatic perspective view of an alternative embodiment of the electronic device of FIGS. 1a and 1b and the anchoring body associated thereto.

The electronic device 10 comprises an electronic unit 20 and an antenna 30 (FIG. 2a-2b).

Preferably the electronic unit 20 is set to detect operating parameters relating to tyre 1 and the operating conditions of the tyre itself.

In particular the electronic unit 20 may comprise one or more sensors to detect said operating parameters which for example, can be the tyre temperature, inner pressure and/or distance covered, possibly calculated in co-operation with the devices located on board.

The electronic unit 20 can be associated with a microprocessor connected to said sensors to manage operation thereof, and with a storage unit to contain the data detected by the sensors.

Preferably stored in the electronic unit 20 (in the storage unit if present) are tyre identification data, to be able to unequivocally identify the tyre during processing and evaluation of the operating parameters mentioned above.

Preferably, the electronic unit 20 is arranged to talk to an electronic apparatus positioned on board the vehicle. To enable communication between the electronic unit 4 and electronic apparatus on board, the antenna 30 is provided to be operatively associated with the electronic unit 20.

In addition to the above, the antenna 30 can be also utilized to power the electronic unit 20 and the devices associated therewith, so as to avoid use of independent powering units within the tyre 1.

Data exchange between the electronic unit 20 and said electronic apparatus takes place through transmission and reception of radio-frequency signals (RF signals) the frequency of which can be included between about 100 kHz and about 50 MHz, and preferably can correspond to about 125 kHz. In particular, this frequency range can be used if feeding of the electronic unit 20 is wished to take place through the antenna 30 itself that in this case would have a configuration of the "closed" type. If on the contrary the antenna is wished to be used for data transmission/reception, also frequencies included between about 300 MHz and about 2.5 GHz can be employed, in which case antennas of a configuration of the "open" type are utilized.

In the present context, an antenna with a configuration of the "open" type means an antenna the configuration of which defines an electrically open circuit. For instance, the antenna body can have one or more ends electrically connected to the detecting unit and one or more "free" ends.

By the expression an antenna with a configuration of the "closed" type it is intended an antenna the conformation of which defines an electrically closed circuit, in which case the antenna body has two ends that are both electrically connected to said detecting unit. Co-operation between the on board devices, antenna 30 and electronic unit 20 therefore constitutes, when requested, a detecting system enabling the electronic unit 20 to also operate without the presence of batteries or similar powering units mounted within the tyre 1.

The antenna 30 has an inner perimetral edge 31 which is adapted to engage with an anchoring body that will be disclosed in the following.

Preferably the antenna 30 has a substantially annular shape.

Preferably the antenna 30 has two separate contact areas for connection with the electronic unit 20, i.e. a first contact area 31a and a second contact area 31b. In particular the electronic unit 20 has an elongated shape extending along a main longitudinal direction D from the first to the second contact area 31a, 31b of said antenna 30 (FIGS. 3a-3c, 4a-4c).

In the preferred embodiment, the electronic unit 20 has a substantially prismatic shape, and is preferably in the shape of a parallelepiped.

In case the antenna 30 has an annular shape, and in particular a substantially circular shape, the first and second contact areas 31a, 31b can be diametrally opposed, so that the electronic unit 20 is arranged along a diameter of said annular shape.

In a preferred embodiment, the antenna 30 comprises a first auxiliary antenna of the open type, and a second auxiliary antenna of the closed type.

The first auxiliary antenna can operate at 433 MHz, for example, for data exchange with the electronic apparatus positioned on board of the vehicle.

The second auxiliary antenna can operate at 125 KHz, for example, both for feeding the electronic unit 20 and for data exchange with said electronic apparatus.

Preferably the antenna 30 further comprises an annular support for housing said first and second auxiliary antennas.

In particular said annular support can surround the anchoring body 40.

For installation of the electronic device 10 within tyre 1, an anchoring body 40 is provided, which is mounted on the internal surface 2 of said tyre 1.

The anchoring body 40 comprises at least two portions 41; each portion 41 has a fastening surface 42, secured to the internal surface 2 of the tyre 1, and a groove 43, in which the inner perimetral edge 31 of the antenna 30 is fitted.

The electronic unit 20 is arranged between the two portions 41, so that the engagement between the inner perimetral edge 31 of the antenna 30 and the groove 43 of each portion 41 maintains a constraint between the electronic unit 20 and the anchoring body 40.

Each portion 41 preferably has a retaining portion 44 having a top surface 45 facing away from the fastening surface 42; in the preferred embodiment the groove 43 is formed between the fastening surface 42 and the retaining portion 44.

Preferably, the retaining portion 44 of each portion 41 has a hollow 44*a*, in order to allow an elastic deformation of the same retaining portion 44 and the following engagement between the antenna 30 and the grooves 43.

In other words, the retaining portion 44 can be elastically deformed so that the same retaining portion 44 can be inserted between the electronic unit 20 and the inner perimetral edge 31 of the antenna 30, thereby obtaining the constraint between the electronic unit 20 and the anchoring body 40.

Preferably, each hollow 44*a* faces a respective side wall of the electronic unit 20.

Advantageously each portion 41 has a first side surface 46, on which the groove 43 is formed, and a second side surface 47, which is in contact with electronic unit 20.

In more detail, the second side surfaces 47 of the portions 41 mutually face for engaging the electronic unit 20.

Preferably, the second side surfaces 47 of the portions 41 are substantially parallel to each other.

Preferably, the portions 41 are substantially identical to each other.

Preferably, the electronic unit 20 has a couple of side walls 21 substantially parallel to the main longitudinal direction D; each side wall 21 is at least partly in contact with a respective second side surface 47 of said portions 41.

It is to be noted that the portions 41 of the anchoring body 40 are not in contact with each other, so that a significant mechanical uncoupling of the electronic unit 20 from stresses generated on the same electronic unit 20 by the tyre 1 during running is achieved.

Further, by maintaining a preset distance between the two portions 41, a proper working of the electronic unit 20 is allowed, since sensors and/or transmitting-receiving devices provided therein are not shielded by the material of which the portions 41 are made (for example elastomeric material).

Preferably, each portion 41 has a substantially semi-cylindrical shape; consequently, the anchoring body 40 has a substantially cylindrical shape.

In such a case, the fastening surfaces 42 of the portions 41 define a base of said cylindrical shape.

Each portion 41 of the anchoring body 40 can have a tapered end 48 in contact with the internal surface 2 of the tyre 1 and diverging towards said internal surface 2; in particular, the angle α defined between the fastening surface 42 of the portion 41 and an external inclined side wall of the tapered end 48 is preferably comprised between 25° and 60°, and more preferably between about 40° and about 50°.

It is to be noted that in the description and in the following claims for "diameter", when not referred to a circumference, it is to be intended the maximum overall dimension measured in a plane substantially parallel to the contact surface between the internal surface 2 of the tyre 1 and the anchoring body 40.

Preferably, the diameter of the upper portion of the anchoring body 40, i.e. the portion defined by the retaining portions 44, is comprised between 26 mm and 40 mm, and in particular is comprised between 32 mm and 36 mm.

Preferably, the diameter of the groove 43 is comprised between 20 mm and 35 mm, and in particular is comprised between 23 mm and 30 mm.

Preferably, the diameter of the anchoring body 40 at the contact region with the internal surface 2 of the tyre 1 is comprised between 31 mm and 45 mm, and in particular is comprised between 36 and 40 mm.

Preferably, the ratio between the height of the anchoring body 40 and the height of the electronic unit 20, both measured in a direction perpendicular to the fastening surface 42 and/or to the top surface 45, is larger than 1.

Figure 1A:
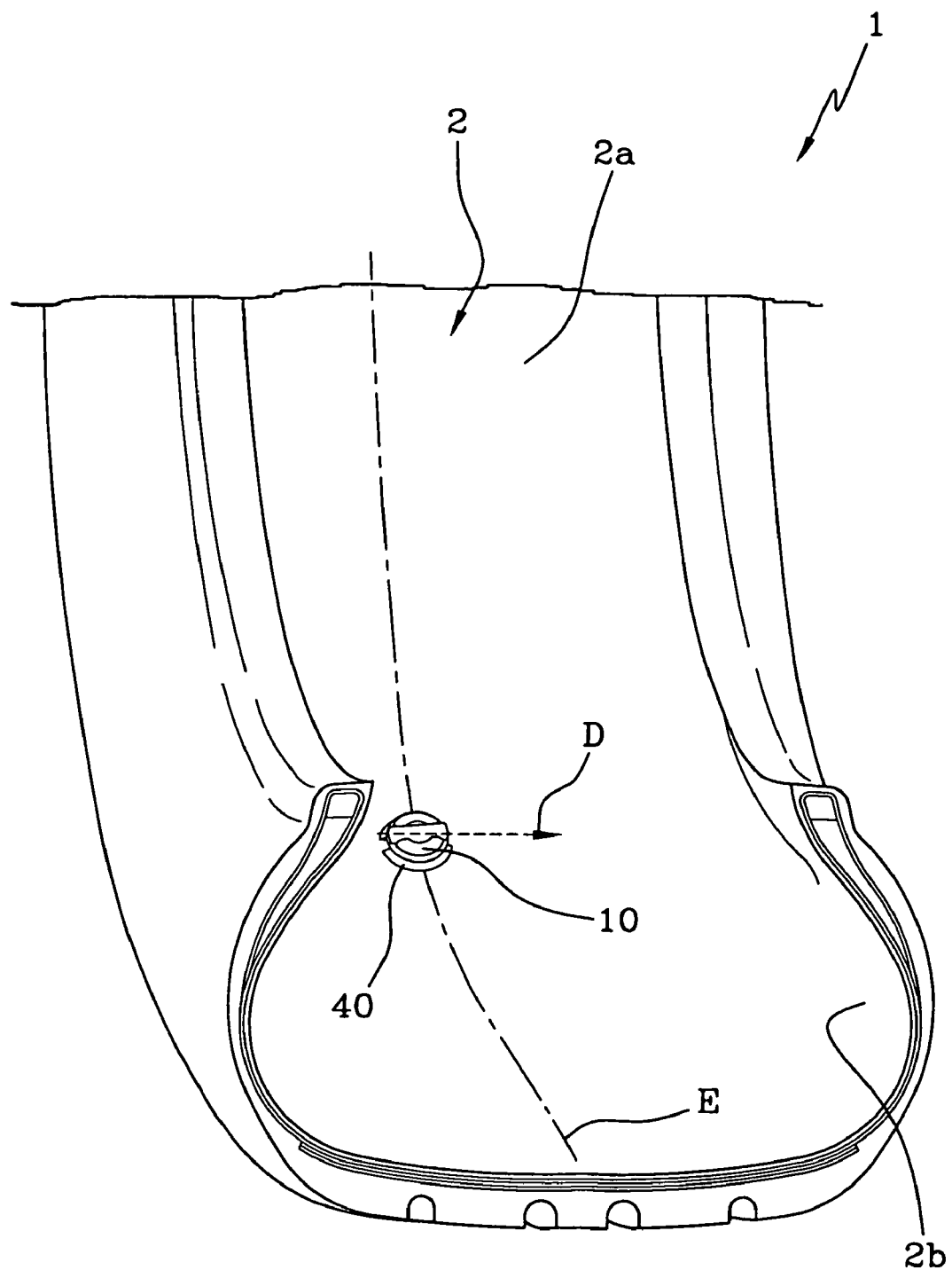
FIG. 1a is a diagrammatic perspective view of a portion of the internal surface of a first embodiment of a tyre in accordance with the invention, on which an electronic device is mounted.

In a first embodiment, diagrammatically shown in FIG. 1*a*, the electronic unit 20 is mounted on the internal surface 2 (e.g. on the liner 2*a*) of the tyre 1, and preferably positioned on the equatorial plane E of the same tyre 1; the main longitudinal direction D of the electronic unit 20 is transverse and in particular perpendicular to the equatorial plane E.

Figure 1B:
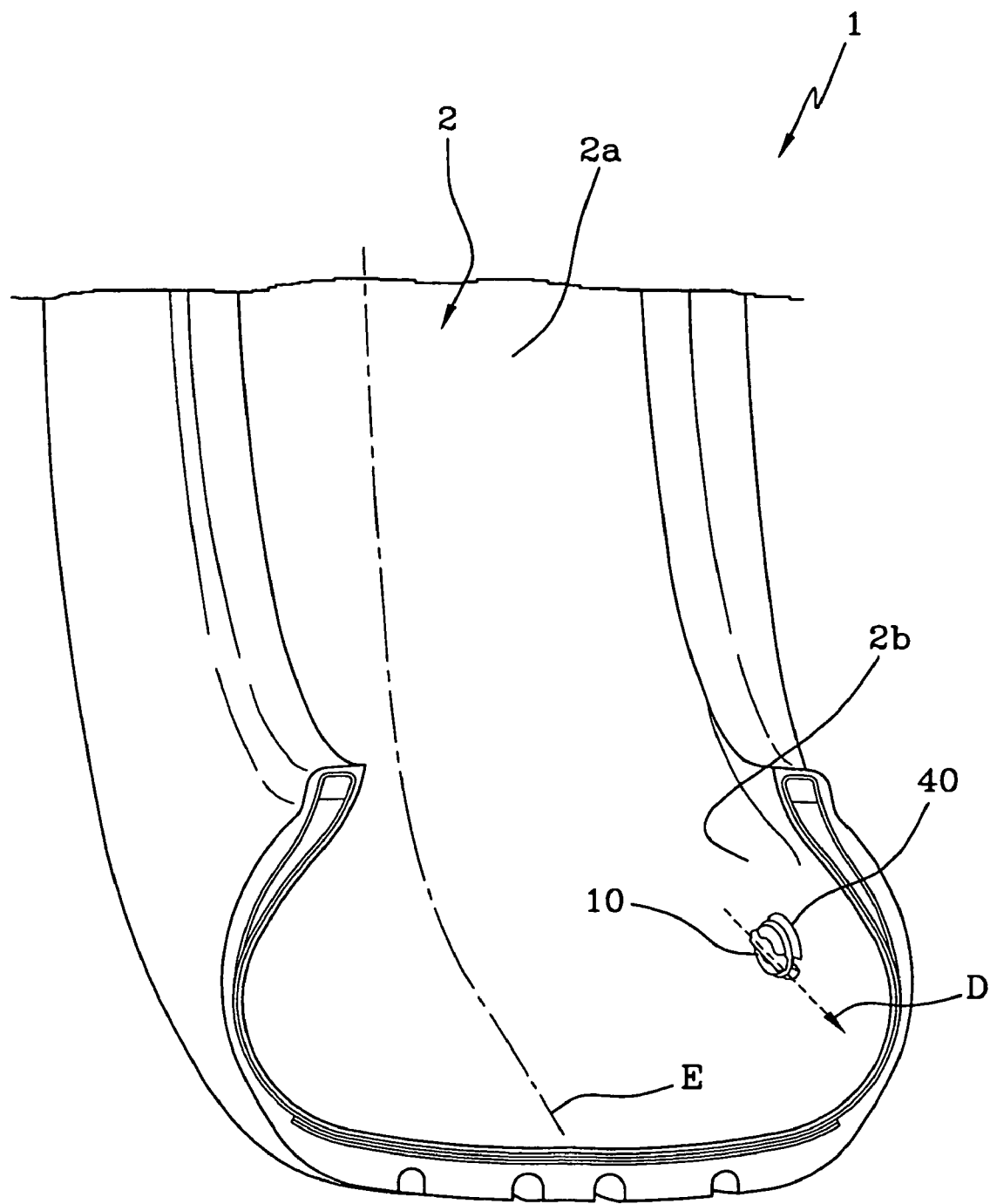
FIG. 1b is a diagrammatic perspective view of a portion of the internal surface of a second embodiment of a tyre in accordance with the invention, on which an electronic device is mounted.

In a second embodiment, diagrammatically shown in FIG. 1*b*, the electronic unit 20 is mounted on a sidewall 2*b* of the tyre 1; the main longitudinal direction D of the electronic unit 20 is substantially parallel to the equatorial plane E.

Preferably, the portions 41 are made of an elastomeric material, selected, for instance, from synthetic diene rubbers, natural rubber, ethylene-propylene rubber, ethylene-propylene-diene rubber and the like.

More in particular, said elastomeric material has a hardness comprised between about 28° Shore A and about 75° Shore A (at the temperature of 23° C.), and preferably between about 36° Shore A and about 50° Shore A (at the temperature of 23° C.).

In a preferred embodiment (FIG. 2*a*), the portions 41 are separate from each other.

In such a case, the fastening surface 42 of the portions 41 can be directly in contact with the internal surface 2 of the tyre 1.

In another preferred embodiment (FIG. 2*b*), the anchoring body 40 further comprises a connection layer 40*a*, with which the fastening surfaces 42 of the portions 41 are connected.

The portions 41 can be mounted on said connection layer 40*a*; alternatively, the portions 41 can be integrally made with said connection layer 40*a*.

Preferably the connection layer 40*a* is made of an elastomeric material; the latter can be selected, for instance, from synthetic diene rubbers, natural rubber, ethylene-propylene rubber, ethylene-propylene-diene rubber and the like.

In particular, the connection layer 40*a* can be made of the same material as the portions 41.

In case the connection layer 40*a* is provided, the portions 41 of the anchoring body 40 are not directly in contact with the internal surface 2 of the tyre 1, the same connection layer 40*a* being interposed between the portions 41 and the internal surface 2.

It is to be noted that in both embodiments (separate portions and portions connected by the connection layer 40a) a satisfactory mechanical uncoupling between the portions 41 is obtained, and in no case the deformations undergone by the tyre 1 during running are transmitted in a significant manner to the electronic unit 20.

When the electronic unit 20 is to be installed within the tyre 1, the portions 41 are arranged so that the second side surfaces 47 face each other.

Preferably, at this stage, the second side surfaces 47 are parallel to each other.

The portions 41 are not in contact with each other; in particular, the portions 41 are arranged so that the distance X between the second side surfaces 47 is substantially equal to the dimension of the electronic unit 20 measured in a direction transverse, and preferably perpendicular, to the main longitudinal direction D.

Practically, such dimension is measured in a direction substantially perpendicular to the second side surfaces 47 of the portions 41; indeed, in the preferred embodiment, the second side surfaces 47 are substantially parallel to the main longitudinal direction D of the electronic unit 20 when the electronic device 10 and the anchoring body 40 are assembled.

The electronic unit 20 is then inserted between the portions 41, and in particular between the second side surfaces 47; preferably the insertion direction is substantially perpendicular to the fastening surfaces 42 of the portions 41.

In other words, the step of inserting the electronic unit 20 between the second side surfaces 47 comprises mutually moving towards each other the anchoring body 40 and the electronic device 10 along a direction substantially perpendicular to the fastening surfaces 42.

In more detail, before moving towards each other the anchoring body 40 and the electronic device 10, the electronic device 10 is closer to the top surface 45 than to the fastening surface 42 of each portion 41.

The electronic device 10 has a vertical axis passing through a center of gravity of the same electronic device 10 and substantially perpendicular to the plane on which the antenna 30 lies.

The anchoring body 40 has a vertical axis passing through a center of gravity of the same anchoring body 40 and substantially perpendicular to the fastening surfaces 42 of the portions 41.

Preferably, during the step of inserting the electronic unit 20 between the portions 41, the vertical axis of the electronic device 10 and of the anchoring body 40 are substantially coincident.

Preferably during the step of inserting the electronic unit 20 between the portions 41, the antenna 30 is inserted into the grooves 43 of the portions 41, so that the second side surfaces 47 are maintained in contact with the electronic unit 20 and the electronic device 10 is thus engaged with the anchoring body 40. Preferably, during the step of fitting the inner perimetral edge 31 of the antenna 30 into the groove 43 of each portion 41, the vertical axis of the electronic device 10 and of the anchoring body 40 are substantially coincident.

The insertion of the electronic unit 20 between the second side surfaces 47 and the insertion of the antenna 30 in the grooves 43 are obtained by an elastic deformation of the retaining portions 44 of each portion 41.

As disclosed above, the portions 41 can be separate portions.

Alternatively, the portions 41 can be connected by the connection layer 40a; in such a case, the method according to the invention can include a step of mounting the portions 41 on the connection layer 40a.

It is to be noted that the step of mounting the portions 41 on the connection layer 40a is not carried out in case the portions 41 are made integrally with the connection layer 40a.

Then, the assembly defined by the electronic device 10 and the anchoring body 40 is mounted on the internal surface 2 of the tyre 1.

In particular, the fastening surfaces 42 of the portions 41 are secured to said internal surface 2, for example by means of a proper adhesive material.

In other terms, the anchoring body 40 is made separately from the tyre 1 and is then fastened to the internal surface 2 of the same tyre 1.

In case the portions 41 are separate portions, the adhesive material is directly applied between the portions 41 and the internal surface 2 of the tyre 1, whereas if the connection layer 40a is provided, such adhesive material is preferably applied between the connection layer 40a and the internal surface 2.

The invention claimed is:

1. A tyre having an internal surface of substantially toroidal conformation, comprising:
    an electronic device comprising an electronic unit and an antenna, the latter being connected with said electronic unit and having an inner perimetral edge; and
    an anchoring body mounted on said internal surface for engagement between said electronic device and said tyre, said anchoring body comprising at least two portions, said electronic unit being arranged between said portions, each of said portions having:
        a fastening surface secured to the internal surface of said tyre; and
        a groove in which the inner perimetral edge of said antenna is fitted to maintain a constraint between the electronic unit and the anchoring body.

2. The tyre as claimed in claim 1 wherein each of said portions has a retaining portion having a top surface facing away from the fastening surface, said groove being formed between said fastening surface and said retaining portion.

3. The tyre as claimed in claim 1, wherein each of said portions has a first side surface, on which said groove is defined, and a second side surface, in contact with said electronic unit.

4. The tyre as claimed in claim 3, wherein the second side surfaces of said portions mutually face for engaging said electronic unit.

5. The tyre as claimed in claim 4, wherein the second side surface of said portions are substantially parallel to each other.

6. The tyre as claimed in claim 1, wherein said anchoring body has a substantially cylindrical shape, the fastening surfaces of the portions defining a base of said cylindrical shape.

7. The tyre as claimed in claim 6, wherein said substantially cylindrical shape has a tapered end diverging toward the internal surface of said tyre.

8. The tyre as claimed in claim 7, wherein an angle defined between the fastening surface of each portion and an external inclined side wall of a respective tapered end is between about 25° and about 60°.

9. The tyre as claimed in claim 8, wherein said angle is between about 40° and about 50°.

10. The tyre as claimed in claim 1, wherein the retaining portion of each of said portions has a hollow for allowing elastic deformation of said retaining portion and following engagement between said antenna and said grooves.

11. The tyre as claimed in claim 1, wherein said anchoring body is made of an elastomeric material.

12. The tyre as claimed in claim 11, wherein said elastomeric material has a hardness between about 28° Shore A and about 75° Shore A at temperature of 23° C.

13. The tyre as claimed in claim 1, wherein said electronic unit has an elongated shape extending along a main longitudinal direction from a first contact area of said antenna to a second contact area of said antenna.

14. The tyre as claimed in claim 1, wherein said electronic unit is positioned on a liner of said tyre.

15. The tyre as claimed in claim 1, wherein said main longitudinal direction is substantially perpendicular to the equatorial plane of said tyre.

16. The tyre as claimed in claim 1, wherein said electronic unit is positioned on a sidewall of said tyre.

17. The tyre as claimed in claim 16, wherein said longitudinal direction is substantially parallel to the equatorial plane of said tyre.

18. The tyre as claimed in claim 1, wherein said electronic unit has a prismatic shape.

19. The tyre as claimed in claim 18, wherein said electronic unit has a couple of side walls substantially parallel to said longitudinal direction and each in contact with a respective second side surface of said portions.

20. The tyre as claimed in claim 1, wherein the ratio between the height of said anchoring body and the height of said electronic unit, both measured in a direction perpendicular to the fastening surface and/or a top surface is larger than 1.

21. The tyre as claimed in claim 1, wherein said antenna has a substantially annular shape.

22. The tyre as claimed in claim 1, wherein said portions are substantially identical to each other.

23. The tyre as claimed in claim 1, wherein said portions are separate portions.

24. The tyre as claimed in claim 1, wherein said anchoring body further comprises a connection layer on which said portions are fastened.

25. The tyre as claimed in claim 1, wherein said portions are integrally made with a connection layer.

26. The tyre as claimed in claim 1, wherein said antenna comprises a first auxiliary antenna of an open type, and a second auxiliary antenna of a closed type.

27. The tyre as claimed in claim 26, wherein said antenna further comprises an annular support for housing said first and second auxiliary antennas.

28. A method of installing an electronic unit in a tyre, comprising:
providing a tyre having an internal surface of substantially toroidal conformation;
providing an anchoring body comprising at least two portions, each of said portions having a fastening surface and a groove;
providing an electronic device comprising an electronic unit and an antenna, the latter being connected with said electronic unit and having an inner perimetral edge;
fitting the inner perimetral edge of said antenna into the groove of each of said portions for engagement of said electronic unit between said portions; and
securing the fastening surfaces of said portions to the internal surface of said tyre.

29. The method as claimed in claim 28, wherein each of said portions has a first side surface, on which said groove is defined, and a second side surface, and the step of fitting said inner perimetral edge into said grooves comprises:
arranging said portions so that second side surfaces face each other;
inserting said electronic unit between said second side surfaces; and
inserting said antenna into the grooves of said portions.

30. The method as claimed in claim 29, wherein each of said portions has a retaining portion having a top surface facing away from said fastening surface, the insertion of said electronic unit between said second side surfaces and insertion of said antenna into said grooves being obtained by elastic deformation of said retaining portions.

31. The method as claimed in claim 29, wherein said portions are arranged so that said second side surfaces are substantially parallel to each other.

32. The method as claimed in claim 29, wherein said electronic unit has an elongated shape extending along a main longitudinal direction from a first contact area of said antenna to a second contact area of said antenna.

33. The method as claimed in claim 32, wherein said portions are arranged so that a distance between said second side surfaces is substantially equal to a dimension of said electronic unit measured along a direction perpendicular to said main longitudinal direction.

34. The method as claimed in claim 33, wherein said distance is measured along a direction substantially perpendicular to said second side surfaces.

35. The method as claimed in claim 28, wherein the step of fitting the inner perimetral edge of said antenna into the groove of each of said portions comprises mutually moving toward each other said anchoring body and said electronic device along a direction substantially perpendicular to said fastening surfaces.

36. The method as claimed in claim 28, wherein the portions of said anchoring body are substantially identical to each other.

37. The method as claimed in claim 28, wherein the portions of said anchoring body are made of an elastomeric material.

38. The method as claimed in claim 37, wherein said elastomeric material has a hardness between about 28° Shore A and about 75° Shore A at a temperature of 23° C.

39. The method as claimed in claim 28, wherein the step of securing the fastening surfaces of said portions to the internal surface of said tyre comprises positioning said anchoring body onto a liner of said tyre.

40. The method as claimed in claim 39, wherein the step of securing the fastening surface of said portions to the internal surface of said tyre comprises arranging said anchoring body so that said main longitudinal direction is substantially perpendicular to an equatorial plane of said tyre.

41. The method as claimed in claim 28, wherein the step of securing the fastening surfaces of said portions to the internal surface of said tyre comprises positioning said anchoring body onto a sidewall of said tyre.

42. The method as claimed in claim 41, wherein the step of securing the fastening surface of said portions to the internal surface of said tyre comprises arranging said anchoring body so that said main longitudinal direction is substantially parallel to an equatorial plane of said tyre.

43. The method as claimed in claim 28, wherein the step of fitting the inner perimetral edge of said antenna into the groove of each of said portions is carried out before the step of securing the fastening surfaces of said portions to the internal surface of said tyre.

44. The method as claimed in claim 29, wherein the steps of inserting said electronic unit between said second side surfaces and of inserting said antenna into the grooves of said portions are carried out substantially at the same time.

45. The method as claimed in claim 28, wherein said anchoring body is made separately from said tyre and is fastened to said internal surface.

46. The method as claimed in claim 28, wherein said portions are separate portions.

47. The method as claimed in claim 28, wherein said anchoring body further comprises a connection layer on which said portions are fastened.

48. The method as claimed in claim 47, comprising a step of mounting said portions on said connection layer.

49. The method as claimed in claim 28, wherein said antenna comprises a first auxiliary antenna of an open type, and a second auxiliary antenna of a closed type.

* * * * *

UNITED STATES PATENT AND TRADEMARK OFFICE
CERTIFICATE OF CORRECTION

| | | |
|---|---|---|
| PATENT NO. | : 7,908,918 B2 | Page 1 of 1 |
| APPLICATION NO. | : 12/226609 | |
| DATED | : March 22, 2011 | |
| INVENTOR(S) | : Massimo Brusarosco et al. | |

It is certified that error appears in the above-identified patent and that said Letters Patent is hereby corrected as shown below:

In claim 5, column 8, line 48, "surface" should read --surfaces--.

Signed and Sealed this
First Day of January, 2013

David J. Kappos
*Director of the United States Patent and Trademark Office*